(12) United States Patent
Uehara et al.

(10) Patent No.: US 6,736,597 B2
(45) Date of Patent: May 18, 2004

(54) AXIS SEAL MECHANISM AND TURBINE

(75) Inventors: Hidekazu Uehara, Takasago (JP); Tanehiro Shinohara, Takasago (JP); Kouichi Akagi, Takasago (JP); Masanori Yuri, Takasago (JP); Shin Koga, Takasago (JP); Takashi Nakano, Takasago (JP); Shin Nishimoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/265,765

(22) Filed: Oct. 8, 2002

(65) Prior Publication Data

US 2003/0068224 A1 Apr. 10, 2003

(30) Foreign Application Priority Data

Oct. 9, 2001 (JP) ........................................ 2001-311312

(51) Int. Cl.[7] ................................................. F01D 11/00
(52) U.S. Cl. .................................... 415/174.2; 415/230
(58) Field of Search ......................... 415/174.2, 173.3, 415/230, 170.1, 173.5, 229, 231; 277/355, 53, 173–5, 192; 384/100, 114

(56) References Cited

U.S. PATENT DOCUMENTS 5,135,237 A    8/1992   Flower 6,161,836 A  * 12/2000  Zhou ............................ 277/355
6,308,958 B1 * 10/2001  Turnquist et al. ........... 277/355

FOREIGN PATENT DOCUMENTS

EP           1 013 975      6/2000

\* cited by examiner

Primary Examiner—Edward K. Look
Assistant Examiner—J. M. McAleenan
(74) Attorney, Agent, or Firm—Oblon, Spivak, McClelland, Maier & Neustadt, P.C.

(57) ABSTRACT

The present invention reduces the amount of gas which leaks and flows from a high pressure side to a low pressure side of the axis and maintains good sealing performance even at high differential pressures. The invention discloses an axis sealing mechanism comprising casings which are supported inside of the stable portion, a plurality of planar plates, which are mutually spaced around the axis, each of which is fixed to the casings, positioned so that an inner end of each planar plate makes an acute angle with a peripheral surface of the axis and contacts the peripheral surface of the axis over a predetermined length in an axial direction, a high pressure side plate which is arranged at a high pressure side and a low pressure side plate which is arranged at a low pressure side so as to hold the planar plates therebetween and a flexible plate which is arranged between the planar plates and the high pressure side plate, and is flexible in an axial direction. The invention also discloses a turbine which provides the above sealing mechanism.

16 Claims, 8 Drawing Sheets

AXIS SEAL MECHANISM AND TURBINE

BACKGROUND OF THE INVENTION

1. Field of the Invention

The present invention relates to an axis seal mechanism which is suitable for an axis of large turbo machines such as gas turbines, steam turbines, compressors, pumps, etc. The invention also relates to a turbine which generates motive power by converting the thermal energy of a fluid to kinetic rotational energy, and an axis seal mechanism therefor.

2. Prior Art

Generally, an axis seal mechanism is arranged around the axis of a gas turbine or a steam turbine in order to reduce the amount of gas leaking from the high pressure side of the axis to the low pressure side of the axis. FIG. 12 shows a leaf type seal 1 as one example of a conventional axis seal mechanism.

The leaf type seal 1 consists of planar plates 3 each of which has a predetermined width and which are arranged along the axis of the rotation axis 2.

The outer end of each planar plate 3 is welded to a casing 5 by a brazing part 4. The inner end of each planar plate 3 contacts the peripheral surface of the axis 2 with a predetermined pressure. As shown in FIGS. 12 and 13, the angle between each planar plate 3, the inner end of which contacts the axis 2, and the peripheral surface of the axis 2, which has a direction of rotation indicated by arrow d, is an acute angle.

The planar plates 3 are thus fixed to the casing and seal the peripheral surface of the axis 2 so as to separate the area around the axis 2 into a high pressure area and a low pressure area.

The casing 5 consists of a first baffle 7 at the high pressure side of the planar plates 3 and a second baffle 8 at the low pressure side of the planar plates 3, which are arranged in order to hold the planar plates between them and guide the action of the high pressure.

In the leaf seal 1 thus constructed, the inner end of each planar plate 3 floats away from the peripheral surface of the axis 2 due to the dynamic pressure caused by the rotation of the axis 2 so that the inner ends of the planar plates 3 do not contact the peripheral surface of the axis 2, which also prevents wear.

However, the above leaf seal 1 has the following problem.

The dynamic pressure caused by the axis 2 makes the planar plates 3 float away from the peripheral surface of the axis 2 so as to prevent wear and heating due to friction between the planar plates 3 and the axis 2. The first baffle 7 and the second baffle 8 are arranged so that the space between the first baffle 7 of the high pressure side and each of the planar plates 3 is the same as the space between the second baffle 8 at the low pressure side and each of the planar plates 3; however each planar plate 3 is subject to pressure from the high pressure side to the low pressure side which deforms it towards the radial center of the axis 2, which makes it difficult to maintain the floating state without contact between the inner end of the planar plate 3 and the axis 2.

In order to overcome the above problems, a mechanism wherein a flexible side leaf is arranged between each planar plate 3 and the first baffle 7 has been proposal. The outer periphery of the side leaf is welded to the first baffle 7 by spot welding.

The side leaf of the above leaf seal, when pressure is applied from the high pressure side, bends in the axial direction of the axis 2 and touches the side edge of the planar plates 3 and the space between the planar plates 3 and the first baffle 7 becomes smaller than the space between the planar plates 3 and the second baffle 8. Therefore gas flowing through the space between the axis 2 and the first baffle 7 flows from the inner ends of the planar plates 3 to the outer ends of the planar plates 3 and the planar plates 3 will float on the flowing gas.

However the above leaf seal with the side leaf has the following problem.

Because the side leaf of the above leaf seal is fixed to the first baffle 7, a bending force acts on the periphery of the side leaf as it bends towards the low pressure area. Because the periphery of the side leaf is welded to the first baffle by spot welding and the strength of the spot welding is relatively low, the side leaf may separate from the first baffle 7 due to the temporary bending force applied to the periphery of the side leaf, and the performance for sealing may become insufficient.

SUMMARY OF THE INVENTION

The present invention has been made in view of the above problems and seeks to reduce leakage of gas from the high pressure side to the low pressure side. The present invention also seeks to obtain an axis seal mechanism and a turbine which can maintain good sealing performance even at high differential pressures.

The axis seal mechanism of the present invention comprises a mechanism which prevents a flow of fluid along an axis through a cylindrical space between a stationary portion and the axis, and comprises casings which are supported inside of the stationary portion, a plurality of planar plates, which are mutually spaced in the circumferential direction of the axis, each of which is fixed to the casings and positioned so that an inner end of each planar plate makes an acute angle with a peripheral surface of the axis and contacts the peripheral surface of the axis over a predetermined length in an axial direction, a high pressure side plate which is arranged at a high pressure side of the planar plates and a low pressure side plate which is arranged at a low pressure side of the planar plates so as to hold the planar plates therebetween and a flexible plate which is arranged between the planar plates and the high pressure side plate and is flexible in the axial direction, wherein the flexible plate is fixed to each of the planar plates.

In the above axis seal mechanism, in a sectional view taken along a virtual plane perpendicular to the planar plate, the surface of each planar plate which faces the axis is designated as the bottom face, and the other surface of each planar plate is designated as the upper surface. In this sectional view taken along the virtual plane, the gas pressure which acts on the bottom surface of the planar plate is higher than the gas pressure which acts on the upper surface of the planar plate, therefore, the inner end of each planar plate floats and does not touch the axis.

Specifically, because a gas to which pressure is applied from a high pressure side tends to flow towards the low pressure side, and because the flexible plate is arranged between each planar plate and the high pressure side plate, and the space between each planar plate and the high pressure side plate is smaller than the space between each planar plate and the low pressure side plate, gas will flow from the space between the high pressure side plate and each planar plate in a diagonal direction along the upper and the bottom surfaces of the planar plates, and a low pressure area will extend to the outer end of each planar plate. The distribution of the gas pressure which acts on the upper and the bottom surfaces of each planar plate, when viewed in a section taken perpendicular to the width of each planar plate, forms a triangular shape, with the gas pressure tending to become lower from the inner end of each planar plate to the outer end of each planar plate. The distribution of the gas pressure on the upper surface is almost the same as the pattern of gas pressure on the bottom surface. However, each planar plate is inclined with respect to the peripheral surface of the axis, therefore, the pattern of gas pressure on the upper surface shifts with respect to the pattern of gas pressure on the bottom surface, and a gas pressure differential appears between one surface of the planar plate and the other surface of the planar plate at a given point on the surface.

The gas pressure Fb which acts on the bottom surface of the planar plate is higher than the gas pressure Fa which acts to the upper surface of the planar plate, therefore there is a force which makes each planar plate float away from the axis. Because the inner end of the planar plate is chamfered, there is no surface to receive the gas pressure near the inner end of the bottom surface of the planar plate, and only the upper surface of the planar plate receives the gas pressure near the inner end of the planar plate. However, the force which thus acts on the upper surface of the planar plate is cancelled by the pressure Fc due to the gas which flows between the inner end of the planar plate and the peripheral surface of the axis. Thus, the total force due to the gas pressure is (Fb+Fc)>Fa, and therefore each planar plate will bend so as to float away from the peripheral surface of the axis.

Because the flexible plate is fixed to the planar plates, the displacement in the flexible plate along the axis decreases compared to the case that the flexible plate is fixed to the high pressure plate, and a deformation in the outer periphery of the flexible plate decreases, so that the flexible plate does not become separated from the planar plates. As a result, the axis seal mechanism can maintain its sealing performance at a high differential pressure.

In the axis seal mechanism the outer peripheral surface of the flexible plate may be welded to each of said planar plates.

Because the flexible plate is strongly fixed to the planar plates, the flexible plate is prevented from separating from the planar plate as a result of a bending force due to a differential pressure between the high pressure side and the low pressure side.

In the axis seal mechanism the flexible plate may be inserted into a notched portion which is formed in each of said planar plates.

Because the flexible plate is fixed to the planar plates by insertion into the notched portion, it is not necessary to heat the planar plate and the flexible plate for assembly. This prevents the flexible plate and the planar plates thus assembled from being subject to heat deformation or damage, and degradation of the sealing performance is prevented.

The axis seal mechanism may also comprise a mechanism which prevents a flow of fluid along the axis through the cylindrical space between a static portion and the axis, comprising casings which are supported inside the static portion, a plurality of planar plates which are mutually spaced in the peripheral direction of said axis, the outer end of each being fixed to the casings, the inner end of each slidably contacting the peripheral surface of said axis at an acute angle over a predetermined length along said axis, a low pressure side plate, which is arranged in a low pressure side of the axis, and a high pressure side plate, which is arranged in a high pressure side of the axis, which hold the planar plates therebetween, a flexible plate which is arranged between the planar plates and said high pressure side plate and is flexible in an axial direction of said axis, wherein the flexible plate comprises a projecting portion which is held between the casing and the planar plates.

Because the flexible plate can be arranged between each of the planar plates and the high pressure side plate by providing the projecting portion of the flexible plate between the casings and the planar plates, when the outer ends of the planar plates are fixed to the casings, deformation and damage due to heating and forces applied during construction, and degradation of the sealing performance of the axis seal mechanism, are prevented.

In the axis seal mechanism, it is possible for the flexible plate to contact a side edge of each of the planar plates.

Because the flexible plate contacts the side edges of each of the planar plates and is supported by each planar plate, the force which acts on the outer periphery of the flexible plate becomes smaller. The flexible plate thus supported is prevented from separating from the planar plates and the sealing performance is maintained even at high pressures.

A turbine which converts thermal energy into kinetic rotational energy by blowing a high pressure and high temperature fluid flowing onto an active blade in a casing may comprise a turbine which consists of any one of the above axis seal mechanisms.

Because the turbine comprises the axis seal mechanism which reduces the amount of gas leakage even at high differential pressures, it is possible to minimize power loss due to leakage.

DESCRIPTION OF THE PREFERRED EMBODIMENT

Hereinafter, embodiments of an axis seal mechanism and turbo machinery which includes the axis seal mechanism are described. However the invention is not particularly limited thereto. The invention is explained by reference to an embodiment of a gas turbine, however the invention is not limited to gas turbines and can be applied to other kinds of turbines.

The first embodiment will be explained with reference to FIGS. 1 to 7.

Figure 1:
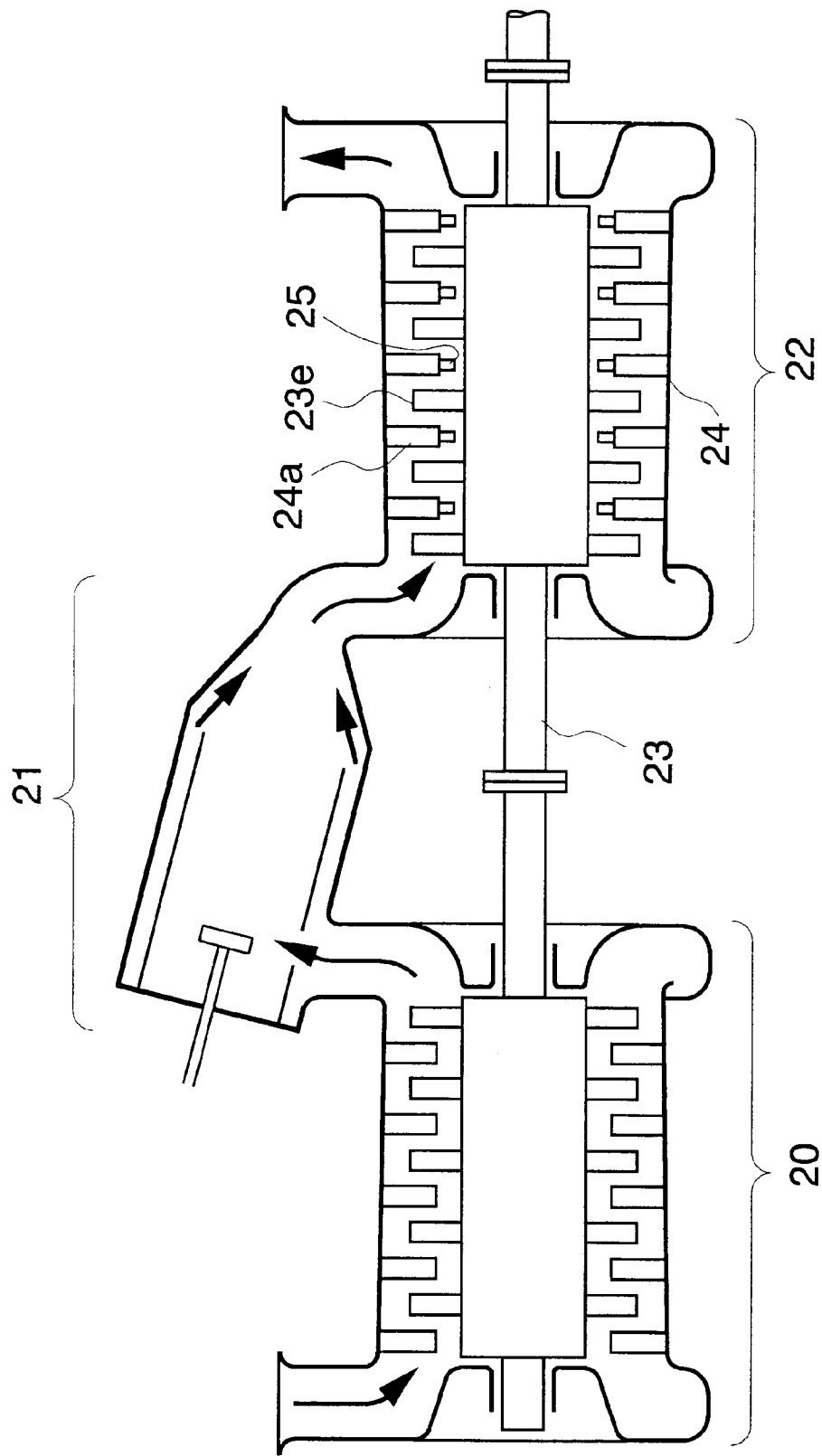
FIG. 1 is a schematic view of the first embodiment of the present invention.

FIG. 1 shows a schematic view of a gas turbine. In FIG. 1, numeral 20 indicates a compressor, numeral 21 indicates a combustor and numeral 22 indicates a turbine. The compressor 20 intakes air and compresses the intaken air. Similarly to a conventional turbine, the compressor 21 is connected to the turbine 22 by an axis 23 and is driven by a part of a driving force which is generated by the turbine 22. The combustor 21 combusts the fuel which is mixed with the air which is compressed by the compressor 21. The turbine is driven by the expansion of the combustion gas (fluid) which originates in the combustor 21. Specifically, the expanding combustion gas drives dynamic blades 23e which are fixed to the axis 23 so as to convert the thermal energy of the combustion gas to kinetic energy to rotate the axis 23.

Further to the dynamic blade 23e, the turbine 22 consists of static blades 24a which are fixed to a casing 24. The dynamic blades 23e and the static blades 24a are positioned one after the other. The dynamic blades 23e drive the axis 23 by receiving the pressure of the combustion gas which flows along the axis 23. The axis 23 transmits the rotational power at an axial end portion of the axis 23. A leaf seal 25 is arranged between the static blades 24a and axis 23 as an axis seal mechanism which prevents the leaking of the combustion gas which flows from a high pressure side of the axis 23 to a low pressure side of the axis 23 via circular cavities between the static blades 24a and the axis 23.

Figure 2:
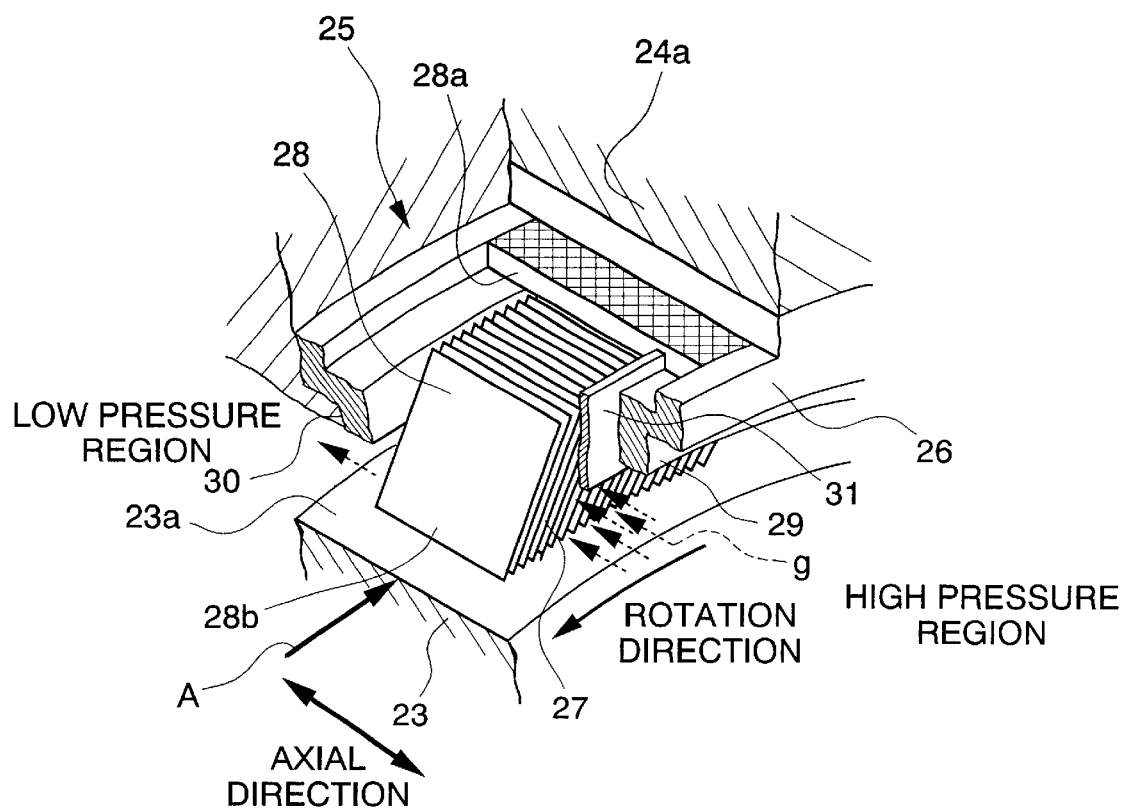
FIG. 2 is an oblique perspective view of the leaf seal (axis seal mechanism) of the first embodiment.

As shown in FIG. 2, the leaf seal 25 consists of a pair of casings 26, which are supported by the inner face of the static blade 24a, and a plurality of planar plates 28 which are aligned separated by a mutual space 27 around the axis 23.

One of the pair of casings 26 has a high pressure side plate 29, which guides the direction of the gas, at a high pressure side of the planar plate 28 and the other one of the pair of casings 26 has a low pressure side plate 30, which also guides the direction of the gas, at a low pressure side of the planar plate 28.

The outer end 28a of each planar plate 28 is fixed to the inner faces of the pair of casings 26 and the inner end 28b of each planar plate 28 touches a peripheral surface 23a of the axis 23 so as to slide along the peripheral surface 23a. The angle between the planar plate 28 and the peripheral surface 23a is acute. Each planar plate 28 is rigid in directions within its plane, but is flexible in a direction which perpendicular to the plane. In other words the planar plate 28 is not readily bent in a direction parallel to the axis but can be easily bent in a direction tangential to the axis. A flexible plate 31 which has flexibility in a direction perpendicular to the flexibility of the planar plates 28 is arranged between the planar plates 28 and the high pressure side plate 29.

Figure 3:
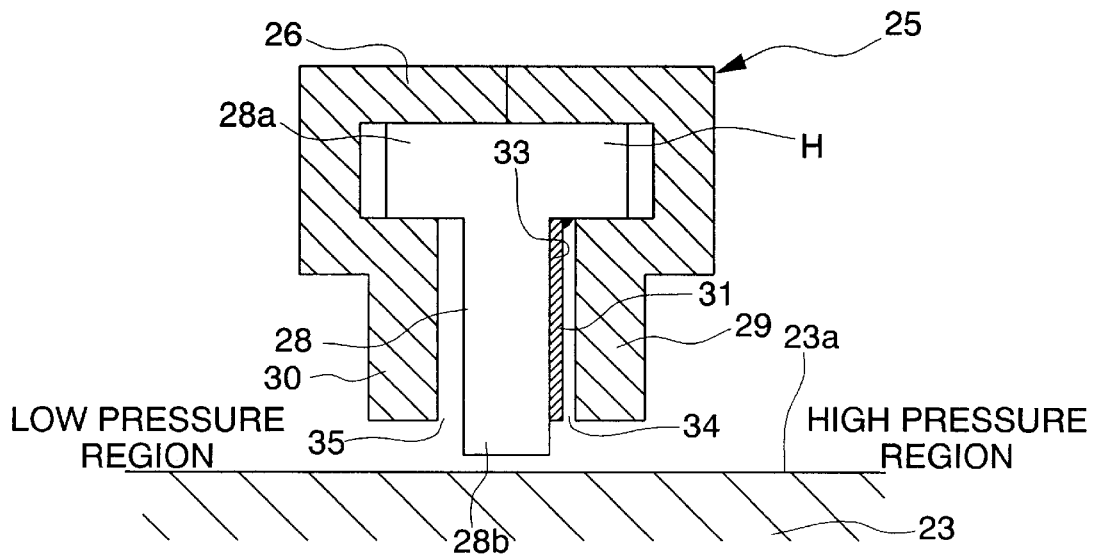
FIG. 3 is a sectional view, taken along the axis, of the leaf seal of the first embodiment.

FIG. 3 is a cross sectional view taken along the arrow A of leaf seal 25. As shown in FIG. 3, the cross sections of the combined pair of casings 26 and each planar plate 28 have a T shape.

The outer end of the flexible plate 31 is rigidly fixed to a bottom end of a head portion H of the planar plate 28 having a T shape. The flexible plate 31 touches the side edge 33 of each planar plates 28. The flexible plate 31 can be bent by pressure from the high pressure side, and touches the side edges 33 of the planar plates 28 and is supported by the side edges 33.

The space 34 at the high pressure side, between the high pressure side plate 29 and the flexible plate 31, is narrower than the space 35 at the low pressure side, between the low pressure side plate 30 and the planar plates 28.

Figure 4:
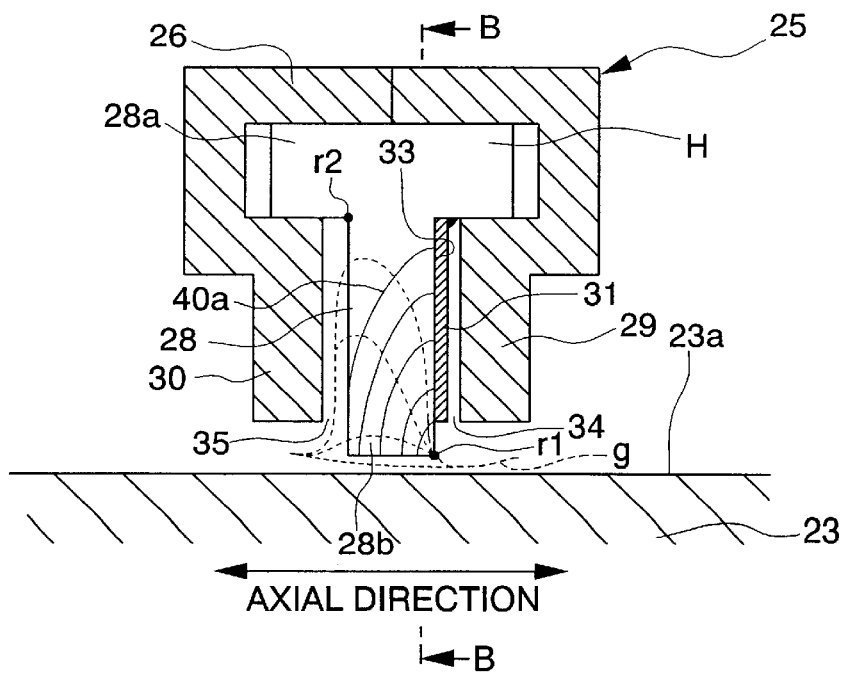
FIG. 4 is another sectional view, taken along the axis, of the leaf seal of the first embodiment.
Figure 5:
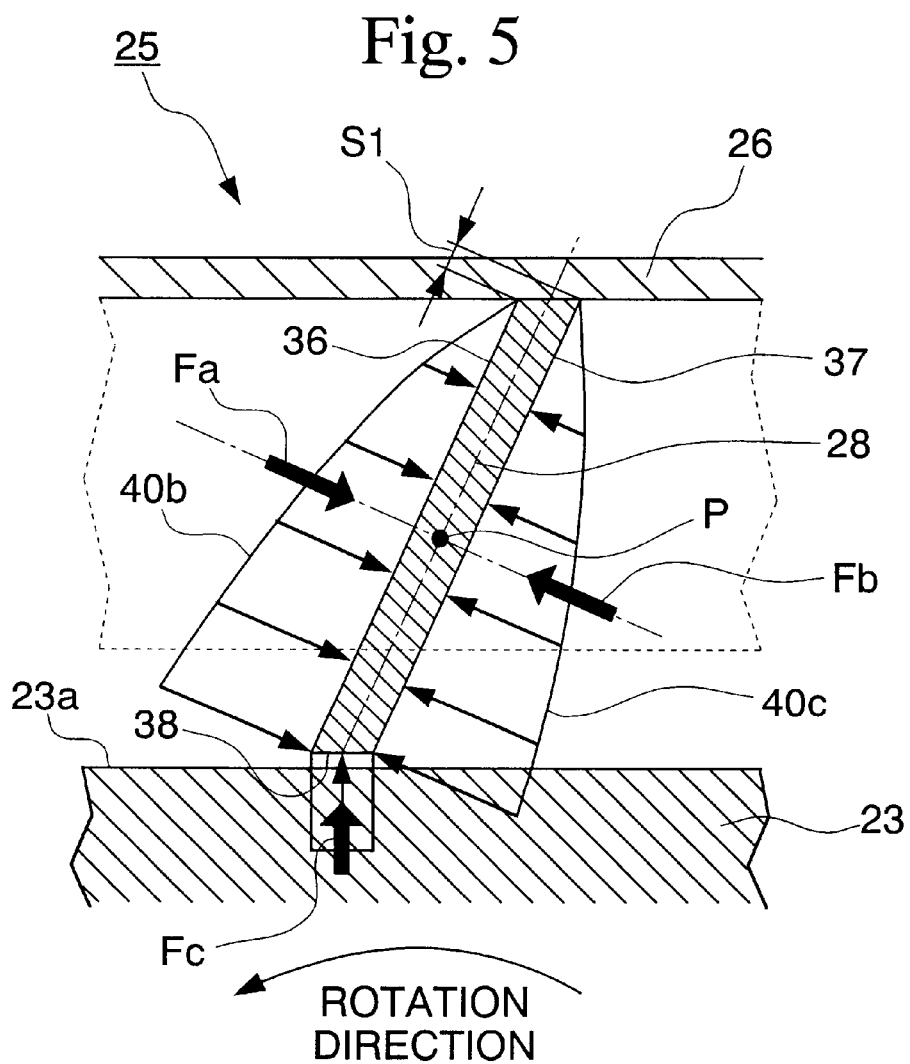
FIG. 5 is a sectional view taken along the line B—B of the leaf seal of the first embodiment.

As shown in FIGS. 4 and 5, because the space 34 at the high pressure side is narrower than the space 35 at the low pressure side, the gas g which is subjected pressure from the high pressure area to the low pressure area will broadly flow along the upper surface 36 and the bottom surface 37 of each planar plate 28, and the area of low pressure will expand to the outer end 28a. In other words, the distribution patterns 40a of the gas pressure on the upper surface 36 and the bottom surface 37 of the planar plates 28 have a triangular shape in which the gas pressure is highest at the corner r1 which is located at the inner end 28b of the planar plate 28 and faces the high pressure side plate 29 and the gas pressure becomes lower at the diagonally oppsosite corner r2.

Specifically, the gas g from the high pressure area passes between the inner ends 28b of the planar plates 28 and the peripheral surface 23a of the axis 23 and flows along the upper surface 36 and the bottom surface 37 of the thin plats 28 to the low pressure area. Therefore a stream of the gas which flows into a space between the high pressure side plate 29 and the peripheral surface 23a of the axis 23 expands in the radial direction from the corner r1 to the corner r2, and the low pressure area will expand forwards the outer end 28a. As shown in FIG. 5, the pressure pattern 40b of gas which is perpendicular to the upper surface 36 of the planar plate 28 and the pressure pattern 40c of gas which is perpendicular to the bottom surface 37 of the planar plate 28 have a triangular shape in which the pressure is higher near the inner end of the planar plate 28 and also is lower near the outer end of the planar plate 28.

The pressure pattern 40b on the upper surface 36 is nearly the same as the pressure pattern 40c on the bottom surface 37. However, the planar plates 28 are inclined with respect to the peripheral surface 23a of the axis 23 so as to make at an acute angle, therefore the pressure patterns 40b and 40c are shifted with respect to each other by a distance s1. At a point P between the outer end 28a and the inner end 28b, the pressure Fb applied to the bottom surface 37 is higher than the pressure Fa applied to the upper surface 36, therefore a force which bends the planar plates 28 is exerted so as to make the planar plates 28 float away from the peripheral surface 23a of the axis 23.

In contrast, because the inner edge of the planar plate 28 is chamfered so as to make a plane 38 for touching the peripheral surface 23a, a force due to the gas pressure only acts to the upper surface 36 in the vicinity of the outer end 28a of the planar plate 28. Because the pressure of the gas which flows between the peripheral surface 23a of the axis 23 and the inner end 28b of the planar plate 28 produces a force Fc which floats the inner end 28b of the planar plate 28 away from the peripheral surface 23a, the force acting on the upper surface 36 is cancelled and there is no force pushing the outer end 28a of the planar plate 28 towards the peripheral surface 23a of the axis 23. The forces Fa, Fb and Fc which act on each planar plate 28 can be expressed by the equation (Fb+Fc)>Fa, and therefore the planar plates 28 can be bent so as to float away from the peripheral surface 23a. The planar plates 28 thus constructed can be maintained in a non-touching state where the outer end 28a floats away from the peripheral surface 23a due to the pressure differential between the upper surface 36 and the bottom surface 37.

Next, a method to assemble the casing 25 will be explained.

(i) Aligning the planar plates 28 which are formed by masking and etching and are separated from each other by a space 27 along the periphery of the axis 23.

(ii) Brazing each outer end 28a of each planar plate 28 so as to connect one planar plate 28 to another planar plate 28.

(iii) Welding the bottom end of the head portion H to the periphery of the flexible plate 31.

(iv) Aligning a pair of separated casings 26 above the low pressure side of each planar plate 28 and the flexible plate 31 so as to enclose the planar plates 28 and the flexible plate 31 by the pair of casings 26.

Besides brazing the outer ends 28c of the planar plates 28, it is possible to braze a side portion of the outer end 28c of the planar plates 28.

Because the leaf seal 25 thus constructed has the flexible plate 31 which makes the high pressure space 34 between the high pressure side plate 29 and each of the planar plates 28 smaller than the low pressure space 35 between the low pressure side plate 30 and each of the planar plates 28, a pressure differential between the upper face 36 and the bottom face 37 of each planar plate 37 [Fa<(Fb+Fc)] occurs and as a result each of the inner ends 28b of the planar plates 28 can float away from the peripheral surface of the axis 23 so that there is no contact between the planar plates 28 and the peripheral surface 23a of the axis 23. Therefore overheating and wear of the planar plates 28 and axis 23 are prevented.

Because the flexible plate 31 is fixed to the flexible planar plates 28 which can easily move in accordance with the deformation of the flexible plate 31, the flexible plate 31 can be easily bent along the axis 23 and the bending force applied to the periphery of the flexible plate 31 is reduced so that the flexible plate 31 is not displaced with respect to the planar plates 28, as compared with the case that the flexible plate 31 is blazed to the rigid high pressure side plate 29. Furthermore, because the flexible plate 31 is rigidly fixed to the planar plates 28 by brazing, the flexible plate is not readily separated from the planar plates 28 by a bending force which is due to the differential pressure between the high pressure area and the low pressure area.

The flexible plate 31 is supported by all of the planar plates 28, by contacting with their side edges 33, and therefore the force which bends the outer periphery of the flexible plate 31 is reduced and a displacement of the flexible plate 31 is prevented. According to the flexible plate 31 thus constructed, the leaf seal maintains its sealing performance even at high differential pressures.

It is not necessary to modify or work on the planar plates 28 in order to attach the flexible plate 31 to the planar plates 28.

A gas turbine which consists of the casing 25 thus constructed can maintain its sealing performance, and therefore has reduced loss of power due to gas leakage.

Hereinafter, other embodiments of the present invention will be explained. The embodiments are explained with priority given to specific subjects, and the same reference numerals are used for the members of the following embodiments which are equivalent to those of the first embodiment, and explanations for the equivalent members are omitted. Because the gas turbines of the following embodiments are the same as that of the first embodiment, explanations for the gas turbines are omitted.

Figure 6:
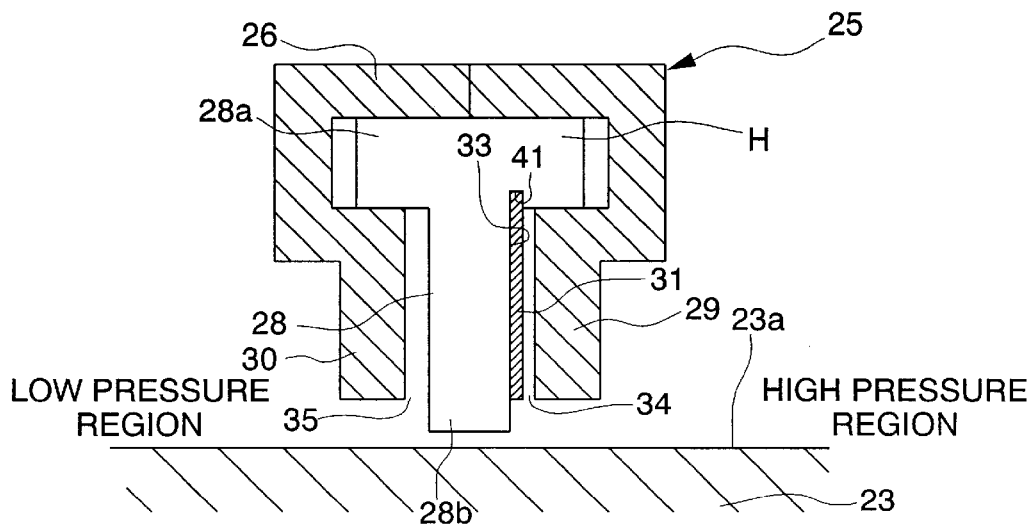
FIG. 6 is a sectional view, taken along the axis, of the leaf seal of the second embodiment.

FIG. 6 shows a cross sectional view of the leaf seal 25 of the second embodiment taken along the axis 23. A notched portion 41 is formed in each bottom portion of the high pressure side head H of planar plates 28. The outer periphery of the flexible plate 41 is inserted into the notched portion 41 so as to be fixed thereto.

The notched portion 41 is tightened once the outer periphery of the flexible plate 31 has been inserted into the notched portions 41, so as to tightly fix the flexible plate 31 to each of the planar plates 28.

With the leaf seal 25 of the second embodiment, it is possible to fix the flexible plate 31 to each of the planar plates 28 without heating for welding or brazing. Therefore, heat deformation and damage due to heating of the flexible plate 31 and planar plates 28 are prevented so as not to degrade the sealing performance.

Figure 7:
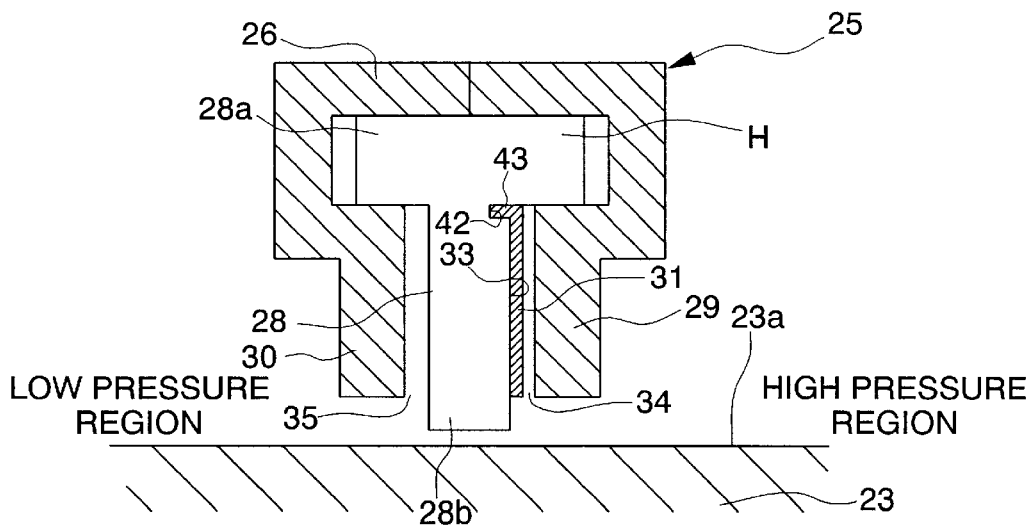
FIG. 7 is a sectional view, taken along the axis, of the leaf seal of the third embodiment.

The leaf seal 25 of the third embodiment of the present invention will be explained with reference to FIG. 7. A notched portion 42 is formed in the side edge 33 of the leaf seal 25 of the third embodiment. The notched portion 42 is directed parallel to the axis 23 and is engaged with a projecting portion 43 which is formed in the outer end of the flexible plate 31.

It is possible to tightly fix the projecting portion 43 of the flexible plate 31 into the notched portion 42 of each of the planar plates 28 by inserting the projecting portion 43 into the notched portions 42.

Because the opening of the notched portion 43 faces a direction parallel to the axis 23, the projecting portion 43 of the flexible plate 31 engages with the notched portion 42 so that the load of the flexible plate 32 is supported by the projecting portion 43. Therefore it is not necessary to clamp the notched portion 42 after inserting the projecting portion 43 of the flexible plate 31 and it is also not necessary to heat the flexible plate 31 for welding or brazing. By the above method for attaching the flexible plate 31 to the planar plates 28, which can be performed without heating or clamping, deformation and damage of the leaf seal 25 are prevented, thus ensuring its performance.

Figure 8:
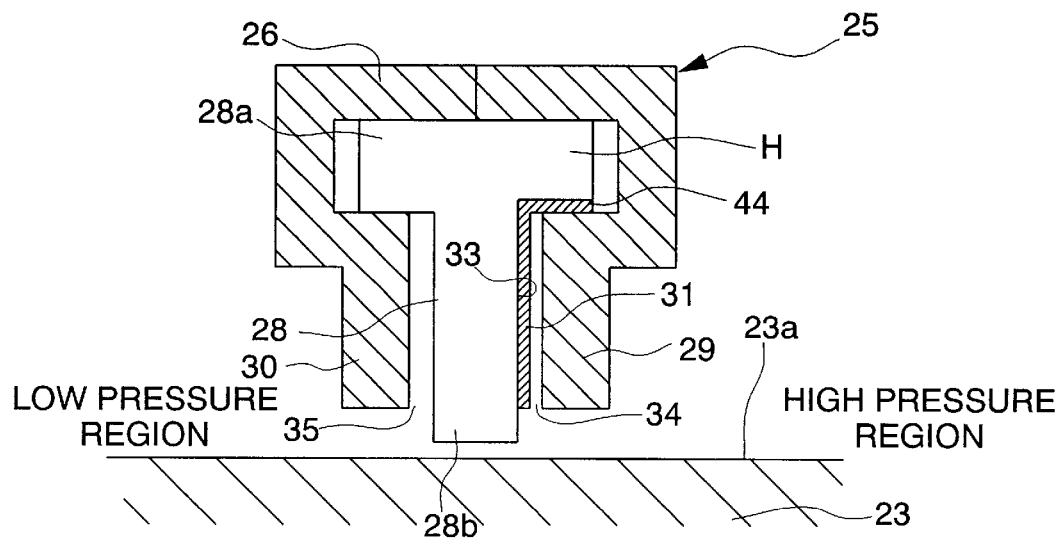
FIG. 8 is a sectional view, taken along the axis, of the leaf seal of the fourth embodiment.
Figure 9:
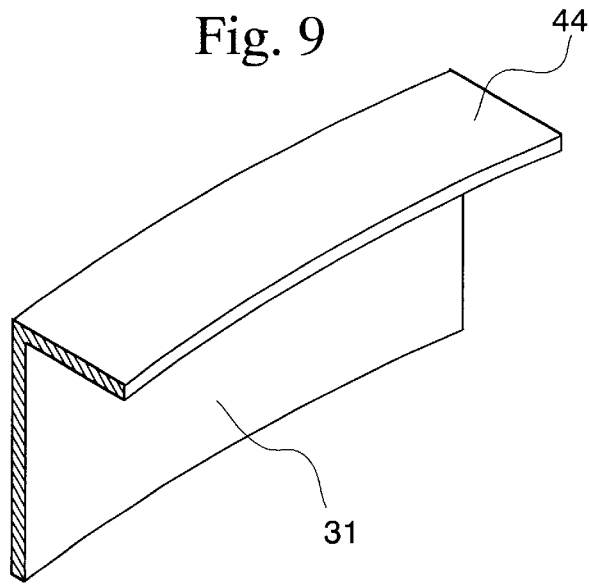
FIG. 9 is an oblique perspective view of a flexible plate of the fourth embodiment.

The leaf seal 25 of the fourth embodiment of the present invention will be explained with reference to FIGS. 8 and 9.

The thickness of the heads H at the high pressure side of the planar plates 25 is smaller than the thickness width of the heads H at the low pressure side of the planar plates 25. The flexible plate is formed so as to have projecting portion 44 which projects towards the high pressure side and is held between the bottom end of the high pressure side head H of the planar plates 28 and the casing 26 is formed.

The flexible plate 31 is arranged to touch the side edges 33 of each of the planar plates 28 and the pair of casings 26 which are aligned along the axis are combined so as to enclose the planar plates 28 and the flexible plate 31. Then the projecting portion 44 of the flexible plate 31 is held between the casing 26 and each of the planar plates 28 and the flexible plate 31 is thus fixed.

Because the projecting portion 44 of the flexible plate 28 is held between the casing 26 and each of the planar plates 28 so as to be held therein, deformation and damage of the planar plates 28 and the flexible plate 31 are prevented, thus ensuring the sealing performance of the leaf seal 25.

Next, the leaf seal 25 of the fifth embodiment of the present invention will be explained with reference to FIGS. 10 and 11.

Figure 10:
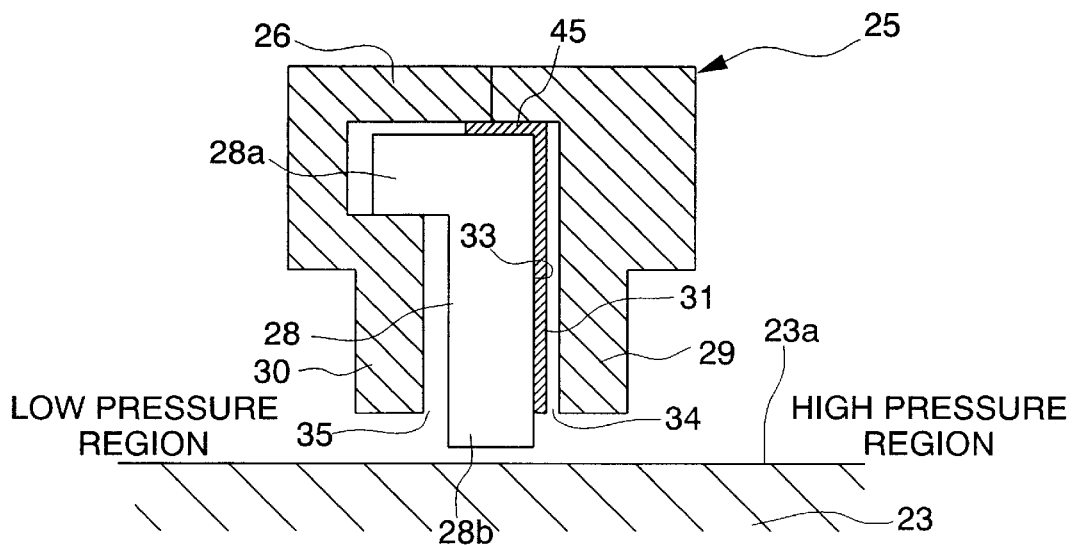
FIG. 10 is a sectional view, taken along the axis, of the leaf seal of the fifth embodiment.
Figure 11:
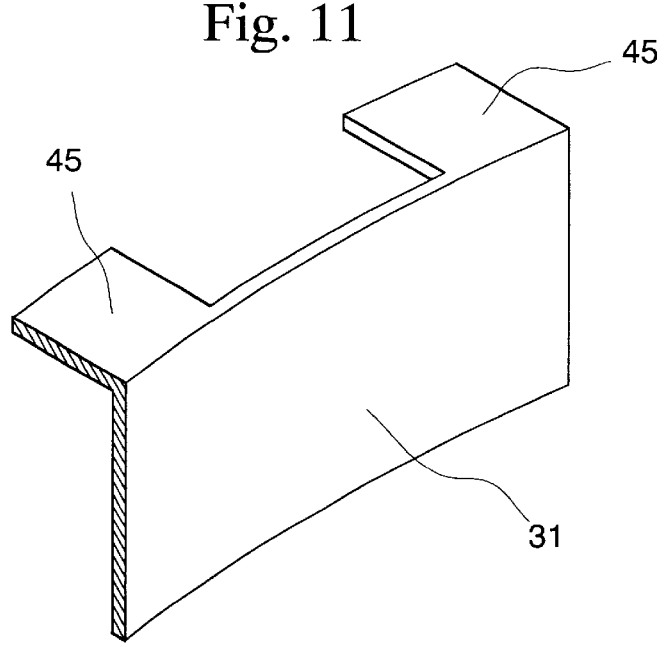
FIG. 11 is an oblique perspective view of a flexible plate of the fifth embodiment.
Figure 12:
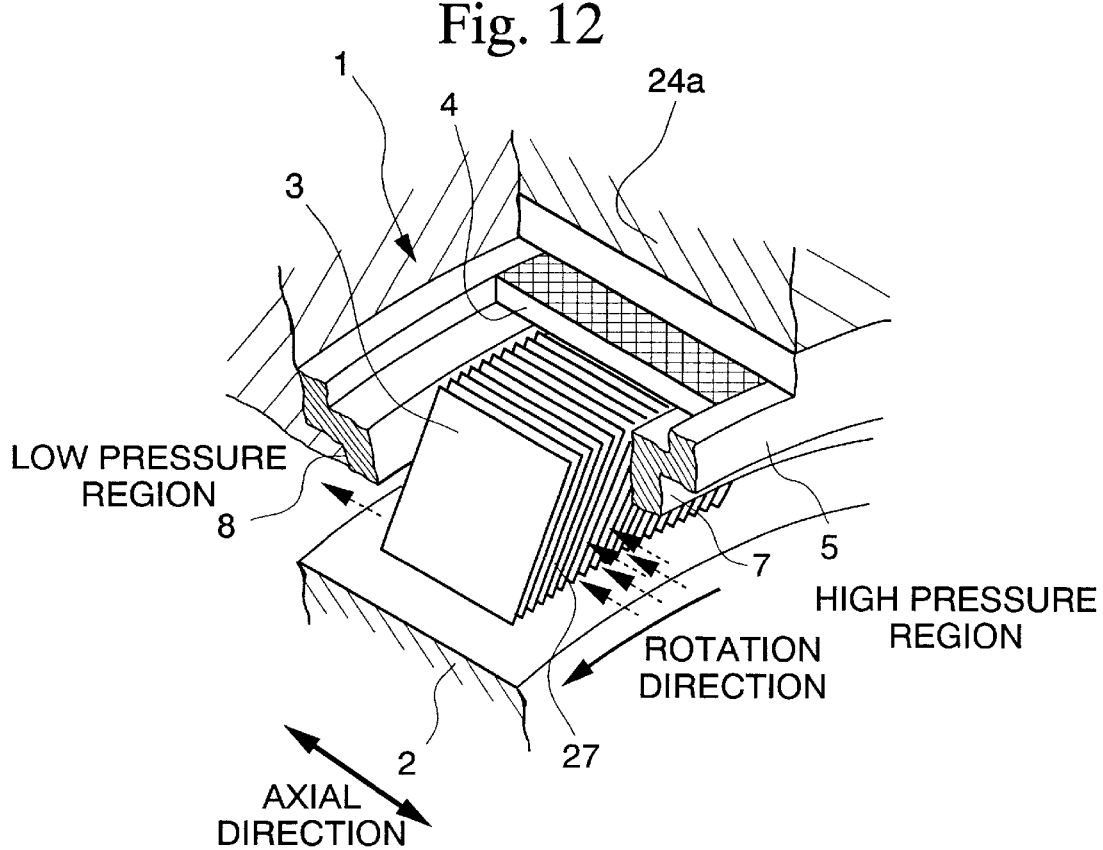
FIG. 12 is an oblique perspective view of a conventional axis seal mechanism.
Figure 13:
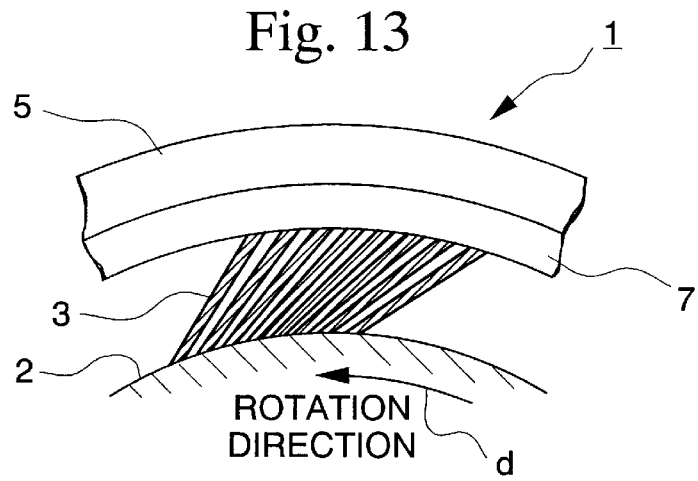
FIG. 13 is a cross sectional view of the conventional axis seal mechanism.

As shown in FIG. 10, the high pressure side of the head portion of each planar plate 28 is omitted, and therefore each planar plate 28 is L-shaped so that the head portion of each planar plate 28 only projects towards the low pressure side.

Projecting portions 45 are formed in the outer periphery of the flexible plate 31. Each projecting portion 45 is arranged at a predetermined space from the next projecting portion 45 around the peripheral direction of the axis 23.

The leaf seal 25 of the fifth embodiment can be assembled by arranging each portion of the casing 26 to enclose the planar plates 28 and combining the pair of casings 26 so as to hold each planar plate 28 and the flexible plate 31 between the casings 26.

Because the projecting portions 45 are formed in the flexible plate 31 separated from each other by a predetermined spacing around the axis 23, flexible plate 31 can be easily bent in accordance with the moving of the side edge 33 of each planar plate 28 and the gas g from the high pressure side does not flow into a space between the flexible plate 31 and each planar plate 28. Therefore, the pattern of the gas pressures 40b and 40c perpendicular to the upper surface 36 and the bottom surface 37 of each planar plate 28 form a triangular shape in which the pressure is the higher the pressed point is closer to the inner end 28b of each planar plate 28 and is also lower the pressed point is closer to the outer end 28a of the planar plate 28.

What is claimed is:

1. A cylindrical seal mechanism which prevents a flow of fluid along a cylinder through a cylindrical space between a stationary portion and the cylinder, comprising:

casings which are supported inside the stationary portion, a plurality of planar plates, which are mutually spaced in the circumferential direction of the cylinder, each of which is fixed to the casings positioned so that an inner end of each planar plate makes an acute angle with a peripheral surface of the cylinder and contacts the peripheral surface of the cylinder over a predetermined length in an axial direction, a high pressure side plate which is arranged at a high pressure side of the planar plates and a low pressure side plate which is arranged at a low pressure side of the planar plates so as to hold the planar plates therebetween, a flexible plate which is arranged between the planar plates and the high pressure side plate and is flexible in an axial direction, wherein the flexible plate is fixed to each of said planar plates.

2. A cylindrical seal mechanism according to claim 1, wherein an outer peripheral surface of said flexible plate is welded to each of said planar plates.

3. A cylindrical seal mechanism according to claim 2, wherein said flexible plate contacts a side edge of each of the planar plates.

4. A turbine which converts thermal energy to kinetic rotational energy by blowing a high pressure and high temperature fluid flowing onto an active blade in a casing, wherein the turbine comprises the cylindrical seal mechanism of claim 3.

5. A turbine which converts thermal energy to kinetic rotational energy by blowing a high pressure and high temperature fluid flowing onto an active blade in a casing, wherein the turbine comprises the cylindrical seal mechanism of claim 2.

6. A turbine which converts thermal energy to kinetic rotational energy by blowing high pressure and high temperature fluid flowing onto an active blade in a casing, wherein the turbine comprises the cylindrical seal mechanism of claim 1.

7. A cylinderical seal mechanism according to claim 1, wherein said flexible plate is inserted into a notched portion which is formed in each of said planar plates.

8. A cylindrical seal mechanism according to claim 7, wherein said flexible plate contacts a side edge of each of the planar plates.

9. A turbine which converts thermal energy to kinetic rotational energy by blowing a high pressure and high temperature fluid flowing onto an active blade in a casing, wherein the turbine comprises the cylindrical seal mechanism of claim 8.

10. A turbine which converts thermal energy to kinetic rotational energy by blowing a high pressure and high temperature fluid flowing onto an active blade in a casing, wherein the turbine comprises the cylindrical seal mechanism of claim 7.

11. A cylindrical seal mechanism according to claim 1, wherein said flexible plate contacts a side edge of each of the planar plates.

12. A turbine which converts thermal energy to kinetic rotational energy by blowing a high pressure and high temperature fluid flowing onto an active blade in a casing, wherein the turbine comprises the cylindrical seal mechanism of claim 11.

13. A cylindrical seal mechanism which prevents a flow of fluid along a cylinder through a cylindrical space between a stationary portion and the cylinder, comprising:

casings which are supported inside the stable portion, a plurality of planar plates which are mutually spaced in the circumferential direction of said cylinder, an outer end of each planar plate being fixed to the casings, positioned so that an inner end of each planar plate makes an acute angle with a peripheral surface of the cylinder and contacts the peripheral surface of the cylinder over a predetermined length in an axial direction, a low pressure side plate, which is arranged at a low pressure side of the planar plates, and a high pressure side plate, which is arranged in a high pressure side of the planar plates, which hold the planar plates threbetween, a flexible plate which is arranged between each planar plate and said high pressure side plate and is flexible in an axial direction, wherein the flexible plate comprises a projecting portion which is held between the casing and each planar plate.

14. A cylindrical seal mechanism according to claim 13, wherein said flexible plate contacts a side edge of each of the planar plates.

15. A turbine which converts thermal energy to kinetic rotational energy by blowing a high pressure and high temperature fluid flowing onto an active blade in a casing, wherein the turbine comprises the cylindrical seal mechanism of claim 14.

16. A turbine which converts thermal energy to kinetic rotational energy by blowing a high pressure and high temperature fluid flowing onto an active blade in a casing, wherein the turbine comprises the cylindrical seal mechanism of claim 13.

* * * * *